July 9, 1935.  A. Y. DODGE  2,007,442

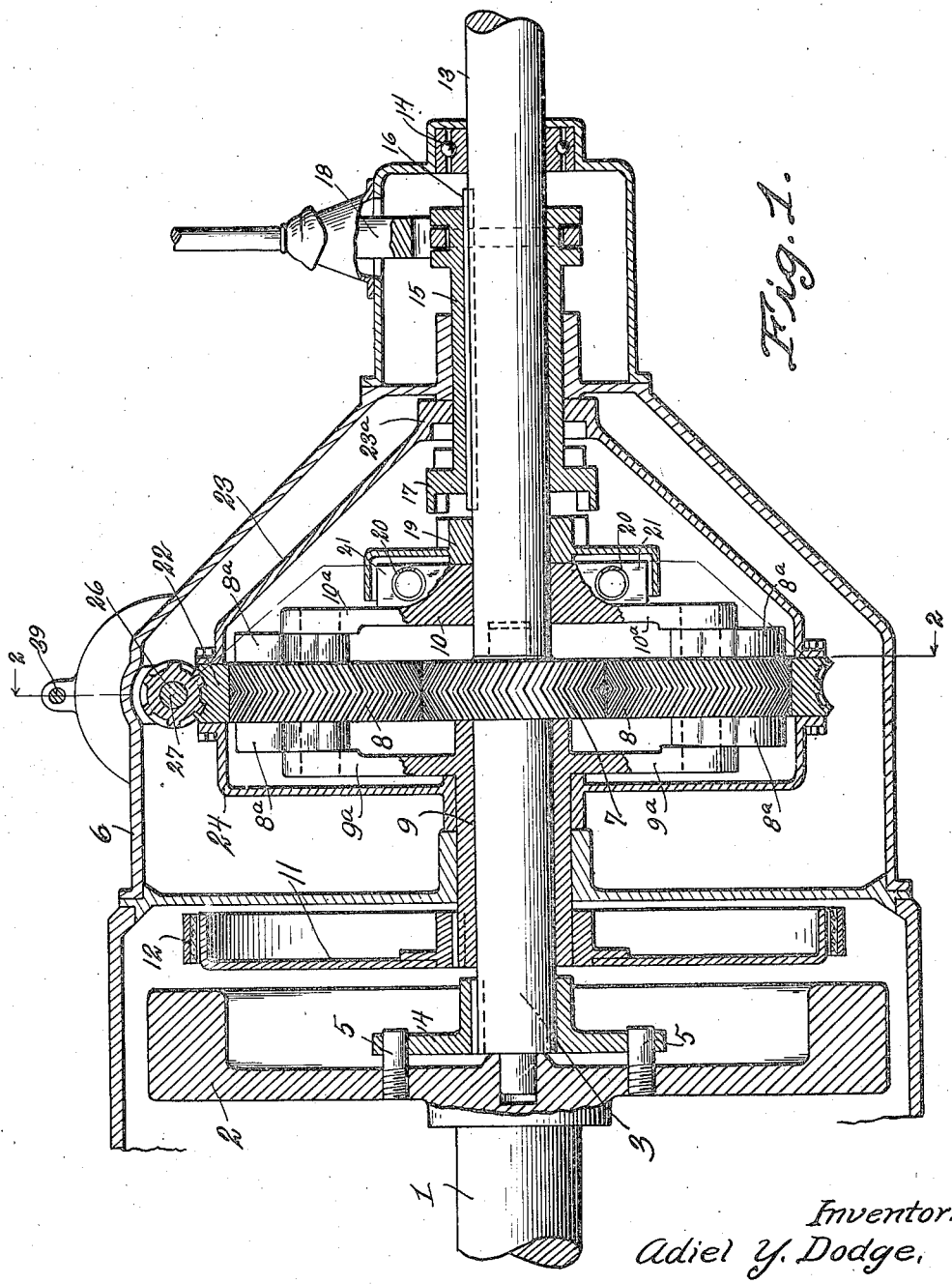

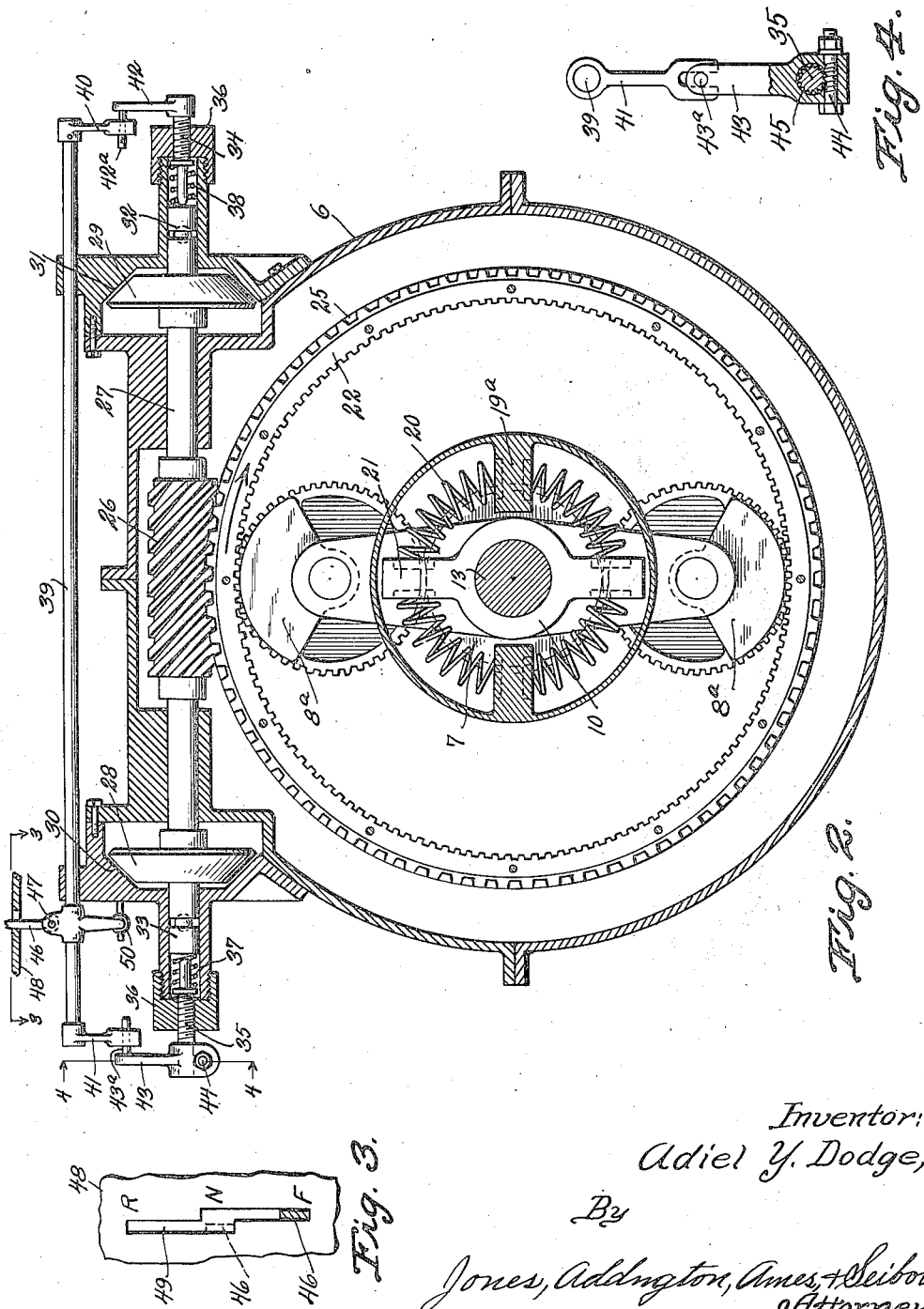

TRANSMISSION

Original Filed July 18, 1930  4 Sheets-Sheet 3

Inventor:
Adiel Y. Dodge,
By
Jones, Addington, Ames & Seibold
Attorneys.

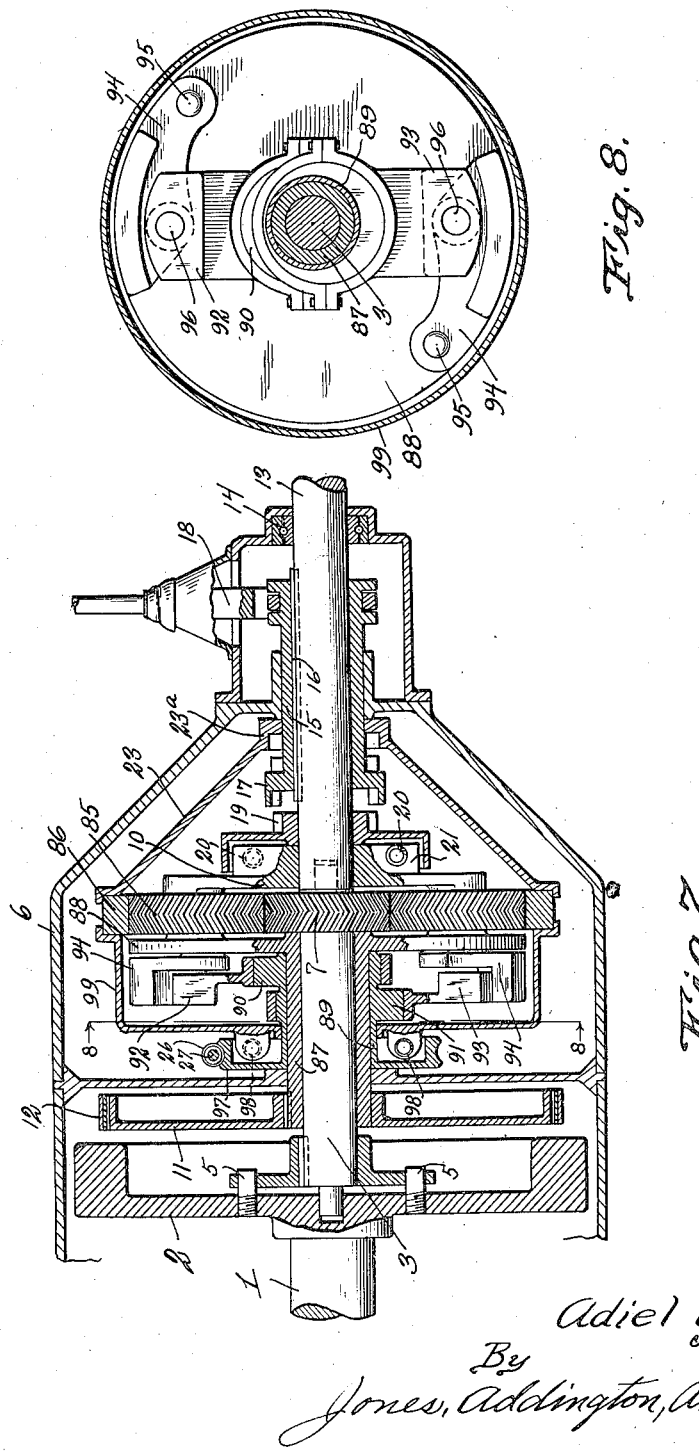

Patented July 9, 1935

2,007,442

UNITED STATES PATENT OFFICE 2,007,442

TRANSMISSION

Adiel Y. Dodge, South Bend, Ind.

Application July 18, 1930, Serial No. 468,786
Renewed January 9, 1934

29 Claims. (Cl. 74—260)

My invention relates to transmissions and more particularly to mass inertia type transmissions in which positive and negative impulses are transmitted through a rotatable member cooperating with a suitable impulse rectifier.

In devices of this type, positive or driving impulses and negative or retarding impulses are transmitted to a driven member, usually from an engine driven shaft. These impulses must be controlled in such a manner that the positive impulse is made effective for driving the driven member while the negative impulse is absorbed or made ineffective.

It is an object of my invention to provide an impulse rectifier in connection with a planetary type of inertia transmission in which the impulses are transmitted to the usual ring gear and in which either the positive or negative impulses may be made effective or ineffective, as desired by the operator, to drive the driven member in either a forward or reverse direction.

Another desirable feature is the provision of an overrunning or reaction clutch of a more rugged and efficient type than those existing to date.

In the drawings:

Figure 1 is a longitudinal section through a plentary mass inertia transmission embodying one form of my invention;

Fig. 2 is a transverse sectional view taken on a line substantially corresponding to line 2—2 of Fig. 1, and illustrates in detail the impulse rectifier and controlling means therefor;

Fig. 3 is a detailed section through the rectifier control lever taken on a line corresponding to line 3—3 of Fig. 2;

Fig. 4 is a detailed section taken substantially on line 4—4 of Fig. 2, and illustrates the impulse rectifier adjusting means;

Fig. 7 is a longitudinal sectional view through an embodiment of my invention, having included therein a combination of planetary type and oscillating mass inertia transmission means in combination with a reversible overrunning clutch similar to that shown in Fig. 2; and Fig. 8 is a transverse sectional view taken on line 8—8 of Fig. 7 and illustrating the construction of the inertia means.

Figures 5, 6:
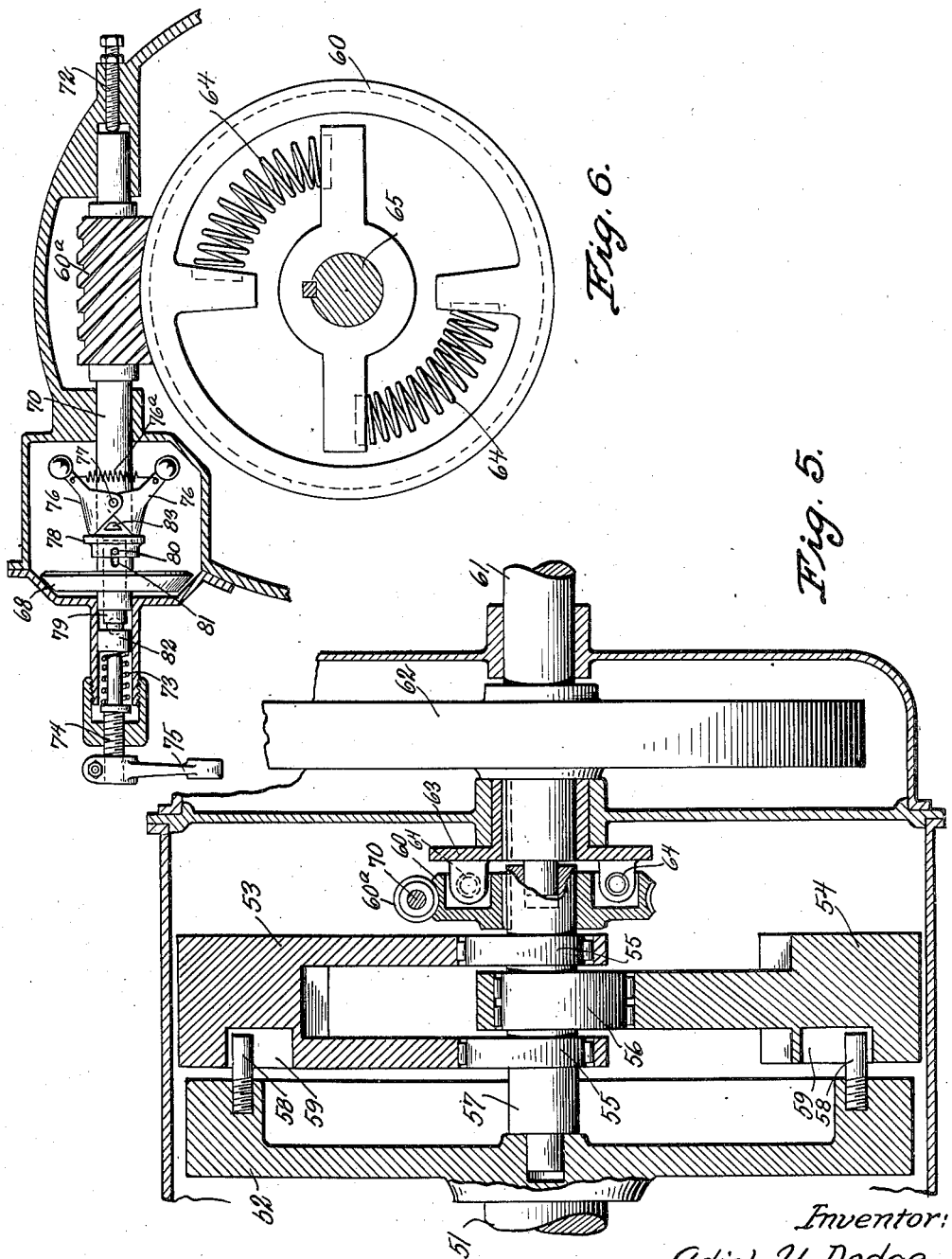
Fig. 5 is a longitudinal section through a different form of mass inertia transmission and illustrates my impulse rectifier as used with an oscillatable transmission.
Fig. 6 is a detailed transverse sectional view illustrating my improved impulse rectifier having incorporated therewith automatic control means.

Referring now to the drawings in detail, the embodiment illustrated in Figure 1 comprises an engine shaft 1 having the usual fly-wheel 2 thereon.

A driving shaft 3 is driven from the shaft 1 through a flexible coupling comprising a disc 4 and pins 5. The planetary transmission is enclosed in a suitable fixed housing 6 and comprises a sun gear 7 on the drive shaft 3, and planet gears 8 mounted on rotatable members comprising a sleeve 9 and a drive member 10 having gear supporting brackets 9a and 10a, respectively. The planet gears are provided with centrifugal weights 8a which are arranged to deliver positive and negative impulses to a suitable ring gear which will be later described.

A brake drum 11 is secured to the sleeve 9 and may be manually controlled by any suitable hand or foot lever means through a brake band 12; that is, the brake band 12 may be operated to prevent the rotation of the sleeve 9 and the drive member 10, thus retaining the planet gears 8 in a fixed rotatable position relative to the sun gear.

A driven shaft 13 is mounted in bearings 14 and in alignment with the drive shaft 3. A slidable bushing 15 is mounted on the shaft 13 by means of a feather key 16, the bushing 15 being provided with a clutch portion 17 and so arranged as to be manually operable by means of a clutch arm 18 to engage the cooperating clutch member 19, which latter is loosely mounted on the driven shaft and connected to the planet gear supporting member 10 through suitable springs 20. The springs 20 are engaged between the inwardly extending lugs 19a on the clutch member 19 and the outwardly extending lugs 21 on the planet gear supporting member 10.

It will be noted that when the brake band 12 is disengaged from the brake drum 11, the clutch member 17 is disengaged from the planet gear clutch member 19, the planet gears may be freely rotated around the sun gear 7. If the clutch members 17 and 19 are then engaged, the driven shaft 13 will be driven forward through the springs 20 if the ring gear 22 is held from turning.

The planetary ring gear 22 is mounted in a rotatable supporting casing comprising members 23 and 24 secured thereto, and is provided with spiral gear teeth 25 which mesh with a cooperating worm 26 (Fig. 2). The ring gear casing has a clutch member 23a formed integral therewith and arranged to be engaged by the clutch member 17 when the sleeve 15 is moved to the right (Fig. 1). By manipulating the lever 18 the sleeve 15 may be moved to the left to engage the clutch members 17 and 19 for direct mass inertia drive, or moved to the right to engage the clutch members 17 and 23a for reverse drive through the planet gears and the ring gear. The worm 26 is secured to a transverse shaft 27 slidably mounted in suitable bearings in the casing 6. The worm 26 is made with a relatively low pitch angle so that it is readily reversible with respect to the movement of the ring gear. It is therefore obvious that it does not require a great amount of torque resistance of the worm shaft to prevent it from turning in either direction. Friction clutch members 28 and 29 are secured to the shaft for cooperation with oppositely disposed clutch surfaces 30 and 31, respectively. The worm shaft 27 is slidably mounted in the bearings so that a very slight movement in either direction will cause one of the clutches to be engaged and prevent the rotation of the worm.

Thrust bearings 32 and 33 are provided at the ends of the shaft 27 and adjusting screws 34 and 35 are mounted in supporting members 36. The inwardly extending ends of the adjusting screws are arranged to engage the thrust bearings and retain a small amount of clearance between the clutch faces. This clearance may be as small as 5/1000 of an inch.

As illustrated in Fig. 2, the adjusting screw 34 is adjusted to prevent the engagement of the clutch 29 with its cooperating clutch surface 31. The opposite screw 35 is somewhat out of engagement with the thrust bearing 33 to allow the engagement of clutch 28 when the worm is moved bodily to the left. It is, therefore, obvious that a positive impulse transmitted through the ring gear in the direction of the arrow will freely rotate the worm and clutch members, while a negative impulse in the opposite direction will cause a bodily movement of the worm to the left and the consequent engagement of the clutch 28 with the clutch surface 30; that is, impulse in the direction of the arrow will accelerate the worm and cause it to turn idly, but upon the occurrence of a negative impulse it brings the worm wheel to rest and attempts to accelerate it in a reverse direction. This will cause the worm to shift bodily in an opposite direction, thereby causing the clutch 28 to engage its seat.

In order to increase the efficiency of this arrangement, I provide springs 37 and 38 for retaining the clutches in disengaged position, and when the device is in the adjusted position shown, the spring 37 normally holds the clutch 28 out of engagement.

The relative strength of the spring determines the rate of deceleration or acceleration of the worm before sufficient thrust is produced to overcome the spring and cause the clutch to engage. That is, immediately following a positive impulse, the worm and clutch are turning at a high rate of speed. When the negative impulse begins, it becomes necessary to decelerate this worm and clutch. If it were not for the spring, the worm would be shifted immediately, and the clutch would be thrown into engagement at this high velocity, but by means of the spring a large portion of this velocity or momentum is transmitted back into the ring gear prior to the shifting of the worm, and the engagement of the clutch.

In order to control the impulse rectifier to utilize either the positive or negative impulses for driving the ring gear in the direction desired, I provide a transverse shaft 39 which is operatively connected to the adjusting screws 34 and 35 by means of slotted arms 40 and 41. The adjustment of the screws 34 and 35 also adjusts the tension of the springs 37 and 38. Arms 42 and 43 are secured to the adjusting screws 34 and 35, respectively, and are provided with pins 42a and 43a engaging in the slotted rock shaft arms 40 and 41, so that by rocking the shaft 39 in one direction the clutch 29 will be held from engagement, and when the shaft is rocked in the opposite direction the clutch 28 will be held out of engagement.

In order that the clutches may be accurately adjusted a micrometer adjustment is provided between the lever 43 and the screw 35 and comprising a threaded bolt 44, Fig. 4, the threads of which engage suitable teeth 45 on the screw 35. An operating lever 46 is secured to the shaft 39 and may be either a foot pedal or hand lever, as desired. An auxiliary pivot 47 allows lateral movement of the lever in order that it may be locked in neutral position and to prevent accidental reverse.

The control lever extends through a guide plate 48 having a slot 49 therein, and is normally held in forward position by a spring 50. The positions of the control lever for "forward", "neutral" and "reverse" are indicated in Fig. 3 at F, N and R, respectively. With the lever in the position shown in Fig. 3, the clutches will be controlled so that movements in the forward direction will be freely permitted and impulses in the reverse direction will be arrested. By moving the lever in its slot and tipping it to the left, it will engage a stop in the slot which will hold it in neutral position and neither of the worm clutches will engage and free movement may take place in both directions. By pushing the lever to its farthest position, indicated by R, the clutches are arranged so that impulses in the forward direction are arrested and movements in the reverse direction freely permitted, thereby producing a reverse drive.

The structure described above is similar in many respects to that disclosed in my prior applications Serial Nos. 180,403, filed April 2, 1927, 320,242, filed November 19, 1928 and 493,950, filed November 7, 1930, and as to all common subject matter is a continuation in part of these applications.

In Fig. 5, I have illustrated an embodiment of my invention in which gears are not used and which comprises a drive shaft 51 having a flywheel 52 thereon and arranged to drive the oscillating rotatable weights 53 and 54 which are mounted on eccentrics 55 and 56 secured to a stub shaft 57. Pins 58 on the flywheel extend into slots 59 for driving the weights.

A worm gear 60 is secured to the stub shaft 57 and is arranged to drive a driven shaft 61 and flywheel 62 thereon through an impulse transforming coupling comprising a flange member 63 secured to the driven shaft and connected to the worm wheel 60 by means of springs 64. The flywheel 62 maintains the uniform speed of the driven shaft while the negative impulses are being rectified or absorbed.

In this construction, the automatically controlled impulse rectifier reaction clutch shown in Fig. 6 is used for rectifying the impulses, the worm 60a meshing with the worm wheel 60. The driven shaft 61 is driven by inertia weights 53 and positive and negative impulses are transmitted to the worm wheel 60 which is coupled to the driven shaft through the springs 64.

In this form a single reaction clutch 68 is used and is secured to a shaft 70 having a worm 60a thereon meshing with the worm wheel 60.

The clearance of the clutch 68 is adjustable by means of the screw 72 which acts as a thrust bearing for the shaft 70. A spring 73, adjustable by the screw 74 and lever 75, retains the clutch normally disengaged.

In order to increase the effective compression of the spring 73 as the speed increases, I provide a compensating governor comprising weighted members 76 pivoted at 77 and bearing against a slidable collar 78, so that as the speed of the shaft increases the collar is moved to the left. A spring 76a normally holds the governor weights in ineffective position. A slidable rod 79 is mounted in the end of the shaft 70 and secured to the collar 78 by a pin 80 extending through a slot 81 in the shaft. The rod 79 rests against a thrust bearing 82, which latter, in turn, rests against the spring 73. A stop 83 on the shaft 70 limits the effective movement of the governor. During the acceleration of the worm in a positive direction, the governor, through the cooperating parts just described, will cause the thrust bearing 82 to compress the spring 73 and the increased compression will retain the clutch out of engagement until the worm has decelerated somewhat and the reduced centrifugal action of the governor allows the clutch to engage.

In Figs. 7 and 8 I have illustrated an embodiment of my invention in which both the planetary and the oscillating transmission previously described are incorporated in a single transmission device and in which a similar overrunning clutch and impulse transformer are used.

Ordinary unweighted planet gears 85 are used in connection with the sun gear 7 on the drive shaft 3, the planet gears meshing with the ordinary ring gear 86. A sleeve 87 is rotatably mounted on the drive shaft 3 and is provided with a flange 88 on which the planet gears are pivoted.

A low speed impulse transformer similar to that previously described is used and comprises the driven member 10 connected with the planet gears, the clutch member 19 and transformer springs 20 and the sleeve 15 on the driven shaft 13 being operable to cause the engagement of the clutch portion 17 with the transformer clutch member 19, or with the clutch member 23A of the ring gear supporting casing 23, the clutch lever 18 being operable to engage either of the clutches desired.

A sleeve 89 is rotatably mounted on the planet gear supporting sleeve 87 and is provided with eccentrics 90 and 91. Weights 92 and 93 are mounted on these eccentrics and are retained in radial alignment by means of weighted levers 94 pivoted at 95 on the flange 88. These levers 94 provide additional weight and are pivotally connected to the weights 92 and 93, as indicated at 96.

The eccentric-supporting bushing 89 is also provided with a worm wheel 97 arranged to mesh with the worm 26 of a reversible overrunning clutch similar to that shown in Fig. 2. An impulse transformer is provided between the worm wheel 97 and the ring gear 86, and comprises impulse transforming and driving springs 98 between the worm wheel 97 and the portion 99 of the ring gear casing.

It will be understood that as the weights are rotated on the eccentrics, they will deliver positive and negative impulses to the worm wheel 97. The overrunning clutch will prevent the backward movement of the worm wheel and the impulses will be transformed through the springs 98 and a positive driving force will be exerted through the ring gear casing and the clutch members 23A and 17 to the driven shaft 13. When a speed has been attained sufficient to cause the centrifugal force of the weights to hold all of the moving parts stationary relative to each other, a direct high speed drive will be maintained from the drive shaft 3, sun gear 7, planet gears 85, ring gear 86, casing 23, and clutch members 23A and 17 to the driven shaft 13.

When the clutch member 17 is brought into engagement with the clutch member 19, the driven shaft will be driven with a positive speed forward through the planet gears and the transforming springs 20.

When the brake 12 is applied to retain the planet gears in fixed position, reverse may be obtained by operating the lever 18 to engage the clutch members 17 and 23.

My invention may be modified without departing from the spirit of the invention, and I desire to be limited only by the prior art and the appended claims.

Having thus described my invention, what I claim and desire to secure by Letters Patent is:

1. The combination with a rotatably mounted worm gear subject to forces tending to make it oscillate about its axis, of means for preventing oscillation in one direction to cause unidirectional rotation of said worm gear comprising a worm meshing with said worm gear and means for preventing rotation of said worm in one direction, comprising a friction member whose effectiveness depends on the axial pressure exerted by the worm gear on the worm, and a movable thrust bearing cooperating with the worm for controlling the effectiveness of the friction member.

2. The combination with a rotatably mounted worm gear subject to forces tending to make it oscillate about its axis, of means for preventing oscillation in one direction to cause unidirectional rotation of said worm gear comprising a worm meshing with said worm gear, and means for preventing rotation of said worm in one direction.

3. The combination with a rotatably mounted worm gear subject to forces tending to make it oscillate about its axis, of means for preventing oscillation in one direction to cause unidirectional rotation of said worm gear comprising a worm meshing with said worm gear and means for preventing rotation of said worm in one direction, comprising a friction member whose effectiveness depends on the axial pressure exerted by the worm gear on the worm.

4. The combination with a rotatably mounted worm gear subject to forces tending to make it oscillate about its axis, of means for preventing oscillation in one direction to cause unidirectional rotation of said worm gear comprising a worm meshing with said worm gear, and means for selectively preventing rotation of said worm in one direction or in the opposite direction.

5. The combination with a rotatably mounted worm gear subject to forces tending to make it oscillate about its axis, of means for preventing oscillation in one direction to cause unidirectional rotation of said worm gear comprising a worm meshing with said worm gear, means for selectively preventing rotation of said worm in one direction or in the opposite direction, comprising two frictional members whose effectiveness depends on the axial pressure exerted by the worm gear on the worm and means for selectively rendering one or the other of said friction members effective.

6. The combination with a rotatably mounted worm gear subject to forces tending to make it oscillate about its axis, of means for preventing oscillation in one direction to cause unidirectional rotation of said worm gear comprising a worm meshing with said worm gear, means for selectively preventing rotation of said worm in one direction or in the opposite direction, comprising two frictional members whose effectiveness depends on the axial pressure exerted by the worm gear on the worm and means for selectively rendering one or the other of said friction members effective, comprising thrust bearing members selectively movable into and out of operative relation with respect to said friction members, etc.

7. The combination with a rotatably mounted worm gear subject to forces tending to make it oscillate about its axis, of means for preventing oscillation in one direction to cause unidirectional rotation of said worm gear comprising a worm meshing with said worm gear and means for preventing rotation of said worm in one direction, and centrifugal force means for controlling the effect of said rotation preventing means.

8. The combination with a rotatably mounted worm gear subject to forces tending to make it oscillate about its axis, of means for preventing oscillation in one direction to cause unidirectional rotation of said worm gear comprising a worm meshing with said worm gear, means for preventing rotation of said worm in one direction and centrifugal force means rotatable with the worm for controlling the effect of said rotation preventing means.

9. The combination with a rotatably mounted worm gear subject to forces tending to make it oscillate about its axis, of means for preventing oscillation in one direction to cause unidirectional rotation of said worm gear comprising a worm meshing with said worm gear and means for preventing rotation of said worm in one direction, comprising a friction member whose effectiveness depends on the axial pressure exerted by the worm gear on the worm, and centrifugal force means rotatable with the worm for controlling the effect of said rotation preventing means.

10. A clutch mechanism comprising a gear, a worm meshing with said gear, movable thrust members for positioning said worm whereby relative angular movement between said gear and worm is effected in either of two directions, stationary thrust members adapted to contact with thrust surfaces at the ends of said worm and means for simultaneously moving said movable members for engagement of a stationary thrust member with either of said thrust surfaces for increasing resistance to angular movement of said worm whereby said relative angular movement is limited to one of either of said directions.

11. A combination planetary and impulse transmission comprising a driving gear, a gear carrier, planetary gearing mounted on said gear carrier and meshing with said driving gear, a driven gear meshing with said planetary gearing, alternating impulse centrifugal transmission for transmitting power from said gear carrier to said driven gear independently of said planetary gearing, and impulse rectifying means acting on said driven gear to cause it to rotate in the same direction as the driving gear.

12. A combination planetary and impulse transmission comprising a driving gear, a gear carrier, planetary gearing mounted on said gear carrier and meshing with said driving gear, a driven gear meshing with said planetary gearing, weighted members connected to the gear carrier for rotation therewith, eccentric members drivably connected to the driven gear and cooperating with the weighted members for causing oscillation thereof upon relative rotation between said members, and means for preventing rotation of the eccentric members in one direction.

13. A combination planetary and impulse transmission comprising a driving gear, a gear carrier, planetary gearing mounted on said gear carrier and meshing with said driving gear, a driven gear meshing with said planetary gearing, alternating impulse centrifugal transmission acting between said gear carrier and driven gear, impulse rectifying means acting on said driven gear to cause it to rotate in the same direction as the driving gear, and means for reversing the action of the impulse rectifying means to cause the driven gear to rotate in a direction reverse to that of the driving gear.

14. A combination planetary and impulse transmission comprising a driving gear, a gear carrier, planetary gearing mounted on said gear carrier and meshing with said driving gear, a driven gear meshing with said planetary gearing, alternating impulse centrifugal transmission for transmitting power from said gear carrier to said driven gear independently of said planetary gearing, impulse rectifying means acting on said driven gear to cause it to rotate in the same direction as the driving gear, means for so controlling the action of the impulse rectifying means that it will enable the driven gear to rotate in a direction reverse to that of the driving gear, and means for holding the gear carrier against rotation to effect reverse rotation of the driven gear.

15. A combination planetary and impulse transmission comprising a driving gear, a gear carrier, planetary gearing mounted on said gear carrier and meshing with said driving gear, a driven gear meshing with said planetary gearing, alternating impulse centrifugal transmission for transmitting power from said gear carrier to said driven gear independently of said planetary gearing, impulse rectifying means acting on said driven gear to cause it to rotate in the same direction as the driving gear, means for reversing the action of the impulse rectifying means to cause the driven gear to rotate in a direction reverse to that of the driving gear, and means for holding the gear carrier against rotation to effect positive reverse rotation of the driven gear.

16. A planetary gear impulse transmission comprising a planetary gear including at least three elements, two of said elements being two coaxial gears and the third comprising planet gearing alternating impulse transmission between two of said elements, means for rectifying reversely acting impulses, and means for reversing the action of said rectifying means.

17. A transmission comprising a driving member, planetary gearing one element of which is driven by the driving member, eccentric means drivably connected to another element of the planetary gearing, weighted means drivably connected to still another element of the planetary gearing and cooperating with the eccentric means for oscillation upon relative movement therebetween, and means for preventing rotation of the eccentric means in one direction.

18. A transmission comprising a driving member, planetary gearing one element of which is driven by the driving member, eccentric means freely rotatable on the driving member, weighted means drivably connected to a second element of the planetary gearing and cooperating with the eccentric means for oscillation upon relative movement therebetween, a yielding connection between the eccentric means and a third element of the planetary gearing and means for preventing rotation of the eccentric means in one direction.

19. A transmission comprising a driving member, a planetary gear train one element of which is connected to the driving member to be driven thereby, alternating impulse means drivably connected to a second element of the planetary train to be driven thereby and connected to a third element of said planetary train for transmitting impulses thereto, and one way reactance means for absorbing the impulses in one direction and preventing transmission thereof to said third planetary element.

20. A transmission comprising planetary gearing, alternating impulse transmission means separate from and connected to one element of said gearing to be driven thereby and to another element of the gearing to transmit impulses thereto independently of said gearing, impulse rectifying means associated with said impulse transmission for absorbing impulses acting in one direction and yielding means associated with the impulse means for cushioning the action thereof.

21. A variable speed transmission comprising planetary alternating impulse, centrifugal force transmission, one-way reactance means for rectifying all reversely acting impulses, said planetary transmission comprising eccentrically loaded planet gearing, a driving gear meshing with said planet gearing and a driven gear meshing with said planet gearing.

22. A variable speed transmission comprising planetary alternating impulse, centrifugal force transmission, one-way reactance means for rectifying the reversely acting impulses, said planetary transmission comprising eccentrically loaded planet gearing, a driving gear meshing with said planet gearing, a driven gear meshing with said planet gearing, a carrier for said planet gearing, means for selectively rendering said one-way reactance means ineffective, and means for selectively holding said carrier against rotation to effect reverse rotation of said driven gear.

23. A variable speed transmission comprising planetary alternating impulse, centrifugal force transmission, one-way reactance means for rectifying the reversely acting impulses, said planetary transmission comprising eccentrically loaded planet gearing, a driving gear meshing with said planet gearing, a driven gear meshing with said planet gearing, said one-way reactance means comprising means for rectifying the reversely acting impulses in all positions of the planetary transmission.

24. A variable speed transmission comprising a driving member, a driven member, and a transmission connecting said driving and driven members for transmitting movement of said driving member to said driven member at a predetermined constant low-speed high-torque ratio for all conditions of drive, or for connecting said driving and driven members for direct drive, said transmission including an eccentrically weighted pinion forming a part of the torque transmitting train for variably amplifying the torque of said driving shaft and transmitting it to the driven shaft, at ratios between said predetermined low-speed high-torque ratio and direct drive.

25. A variable speed transmission comprising a driving member, a driven member, and a transmission connecting said driving and driven members for transmitting movement of said driving member to said driven member at a predetermined constant low-speed high-torque ratio for all conditions of drive, or for connecting said driving and driven members for direct drive, said transmission including an eccentrically weighted pinion carried by the driven member for automatically varying the driving ratio of said transmission.

26. A transmission comprising a driving member, a planetary gear train one element of which is connected to the driving member to be driven thereby, a driven member connected to a second element of the gear train, alternating impulse means connected to the driven member to be driven therewith and connected to an element of the gear train to transmit impulses thereto, and one-way reactance means for absorbing the impulses acting in one direction and preventing transmission thereof to the gear train.

27. A transmission for connecting a driving member to a driven member comprising a planetary gear train, one element of which is connected to the driving member and another element of which is connected to the driven member, and variable-speed torque-multiplying means separate from and connected to be driven by one of the elements of said gear train other than the element connected to the driving member and to drive another element of the gear train at variable speeds independently of said gearing whereby the driving ratio of said transmission will be varied.

28. A variable speed transmission comprising planetary gearing including a sun gear, planet gears and a driven gear, an alternating-impulse centrifugal force transmission associated therewith, one-way reactance means connected to said alternating impulse transmission to rectify the reversely acting impulses, means for selectively rendering said one-way reactance means ineffective, and means for selectively holding the gear carrier of said planetary gearing against rotation in at least one direction to effect reverse rotation of the driven gear.

29. A transmission for connecting a driving member to a driven member comprising planetary gearing, one element of which is connected to the driving member, clutch means for selectively connecting either of two other elements of the gearing to the driven member, one to drive said driven member in the forward direction and the other in the reverse direction, alternating impulse centrifugal means associated with said gearing to transmit impulses thereto, one-way reactance means for absorbing all reversely acting impulses and means for rendering said one-way means ineffective when the driven member is connected to be driven in the reverse direction.

ADIEL Y. DODGE.